No. 867,515. PATENTED OCT. 1, 1907.
L. H. KINNARD.
TIRE PROTECTING DEVICE.
APPLICATION FILED DEC. 8, 1904.
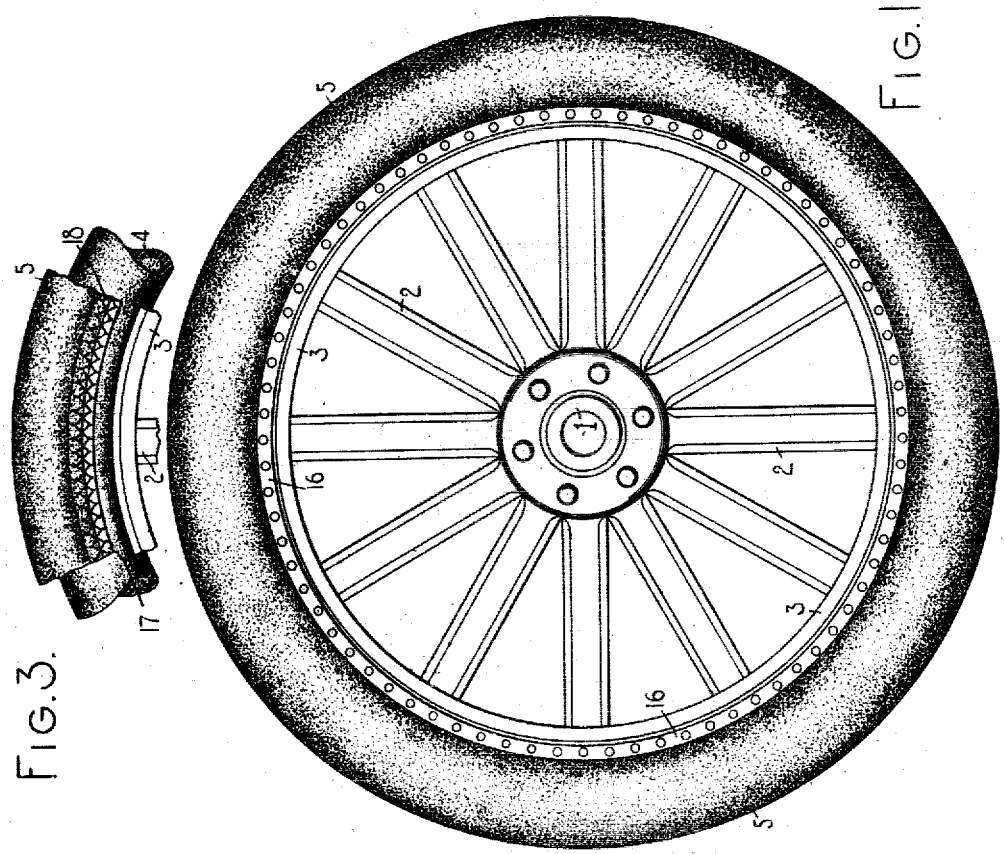
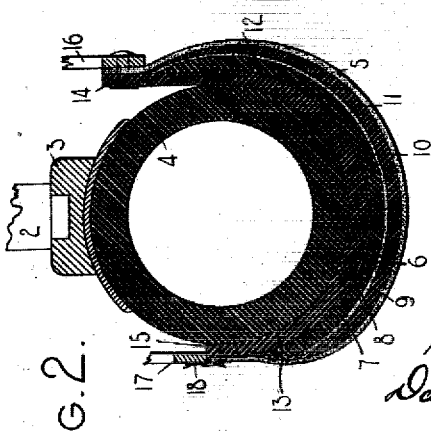
WITNESSES.
Frank B Wimmel
O. H. Glendinning
INVENTOR.
Leonard H. Kinnard
By
Daniel A. Carpenter,
Attorney.

UNITED STATES PATENT OFFICE.

LEONARD H. KINNARD, OF HARRISBURG, PENNSYLVANIA, ASSIGNOR OF ONE-HALF TO ROLLIN S. CHAMBERLIN, OF HARRISBURG, PENNSYLVANIA.

TIRE-PROTECTING DEVICE.

No. 867,515.  Specification of Letters Patent.  Patented Oct. 1, 1907.

Application filed December 8, 1904. Serial No. 235,932.

*To all whom it may concern:*

Be it known that I, LEONARD H. KINNARD, a citizen of the United States, and a resident of Harrisburg, in the county of Dauphin and State of Pennsylvania, have invented a certain new and useful Improvement in Tire-Protecting Devices, of which the following is a full, clear, and exact description, reference being made to the accompanying drawings, forming part of this specification.

This invention relates to improvements in devices which are intended to protect the pneumatic tires of vehicles from punctures and other injuries, the object being to improve the character and increase the utility of such devices. The invention consists of the tire-protecting device which is hereinafter described and claimed.

In the accompanying drawings, in which like reference-numerals designate like parts in different views, Figure 1 is a side view of the inner side of a wheel with the tire-protecting device applied to the tire thereof; Fig. 2, a cross-section of the rim of the wheel and of the tire and protecting-device; and Fig. 3, a side view of a fragment of the outer side of the wheel, tire and protecting-device.

The invention is especially applicable to the tires of automobiles and other heavy vehicles. The wheel shown is like the wheels of many automobiles in construction, it being composed of the hub 1, spokes 2, rim 3, and tire 4. The tire-protecting device comprises a shoe 5 in which the tire fits, and means for securing the shoe on the tire. The shoe is preferably composed of several layers of flexible material, and a convexo-concave sheet-metal ring 6, the layers of flexible material being layers 7, 8, and 9 of rubber, a layer 10 of asbestos, and an outer layer or covering 11 of canvas or leather covered with rubber. The flexible material extends beyond the edges 12 and 13 of the metal ring 6, and forms the edges 14 and 15 of the shoe.

The means shown for securing the shoe to the tire consists of two annular stays fastened to the shoe at its edges 14 and 15. These stays 16 and 17 may be flat metal rings. The smaller stay 16 may be riveted or otherwise permanently fastened to the shoe, but the larger stay 17 is detachable from the shoe. This stay may be fastened to the shoe by means of lacing 18.

The device is applied to the tire when the tire is deflated. The wheel is removed from the axle to enable the stay 16 with the shoe attached thereto to be put in its proper position at the inner side of the wheel. The stay 16 being at the inner side of the wheel and the wheel being on the axle, the edge 15 of the shoe is pulled over the tire and tightly laced to the stay 17, and then the tire is inflated. It will be seen that the stays 16 and 17 are fastened only to the shoe, by which they are supported and held in their proper positions when the tire has been expanded to tightly fit the interior of the shoe, neither stay being in contact with any part of the wheel proper. The shoe is made to extend further inward, or toward the axle, at the inner side of the wheel than it does at the outer side, and the stay 16 is made smaller than the stay 17, to protect the tire on one side to a greater extent than it would be protected there if the shoe had the same diameter at both edges, for to enable the shoe to be easily applied to and removed from the tire the diameter of the shoe at one edge should be made as great or about as great as that of the tire shown, at the edge 15. Both stays may be like the stay 17 if desired.

Obviously a shoe wholly composed of flexible material might be secured to a tire by substantially the means above described, or a shoe including the convexo-concave metal ring 6, or another similar ring, might be secured to a tire by other means besides the stays and fastenings herein shown.

The object of including in the shoe 5 the layer 10 of asbestos is to prevent the shoe and tire from being damaged by heat.

Having thus described my invention, what I claim as new and desire to secure by Letters Patent, is:

1. A tire-protecting device composed of a shoe in which the tire fits, a stay consisting of a stiff endless ring fastened only to the shoe at one edge thereof, another similar stay, and a fastening connecting the shoe at its other edge with the latter stay, said fastening being adjustable to draw the edge of the shoe towards the stay.

2. A tire-protecting device composed of a shoe in which the tire fits, a stay consisting of a stiff endless ring fastened only to the shoe at one edge thereof, another similar stay, and a fastening connecting the shoe at its other edge with the latter stay, said fastening being adjustable to draw the edge of the shoe towards the stay and being detachable from the stay.

3. A tire-protecting device composed of a shoe in which the tire fits, a stay consisting of a stiff endless ring fastened only to the shoe at one edge thereof, another similar stay, and means for detachably fastening the shoe at its other edge to the latter stay, said means being adjustable to draw the edge of the shoe towards the stay.

4. A tire-protecting device composed of a shoe in which the tire fits, an annular stay fastened only to the shoe at one edge thereof, another annular stay, and means comprising lacing for detachably fastening the shoe at its other edge to the latter stay.

5. A tire-protecting device composed of a shoe in which the tire fits, and stays consisting of stiff endless rings fastened only to the shoe at its edges, one of the stays being larger than the other.

6. A tire-protecting device composed of a shoe in which the tire fits, and stays consisting of stiff endless rings fastened only to the shoe at its edges, one of the stays being larger than the other and the shoe being detachable from the larger stay.

7. A tire-protecting device composed of a shoe in which the tire fits, a stay consisting of a stiff endless ring fastened only to the shoe at one edge thereof, another larger stay similar to the first-mentioned stay, and means for detachably fastening the shoe at its other edge to the larger stay.

8. A tire-protecting device composed of a shoe in which the tire fits, an annular stay fastened only to the shoe at one edge thereof, another larger annular stay, and means comprising lacing for detachably fastening the shoe at its other edge to the larger stay.

9. A tire-protecting device composed of a shoe in which the tire fits, and annular stays fastened only to the shoe at its edges, said shoe including a convexo-concave ring of hard material, whose diameter is greater at one edge than at the other.

10. A tire-protecting device composed of a shoe in which the tire fits, and annular stays fastened only to the shoe at its edges, said shoe including a convexo-concave metal ring whose diameter is greater at one edge than at the other.

11. A tire-protecting device composed of a shoe in which the tire fits, and stays consisting of stiff endless rings of different diameters fastened only to the shoe at its edges, said shoe including a convexo-concave ring of hard material.

12. A tire-protecting device composed of a shoe in which the tire fits, and stays consisting of stiff endless rings of different diameters fastened only to the shoe at its edges, said shoe including a convexo-concave metal ring.

LEONARD H. KINNARD.

In presence of—
ROLLIN S. CHAMBERLIN,
B. MAE CARTER.